US010491867B2

(12) United States Patent
Unver et al.

(10) Patent No.: US 10,491,867 B2
(45) Date of Patent: Nov. 26, 2019

(54) SHARING PROJECTOR-CAMERA WORKSPACES (71) Applicant: Regents of the University of Minnesota, Minneapolis, MN (US)

(72) Inventors: Baris Unver, Minneapolis, MN (US); Svetlana Yarosh, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 5 days.

(21) Appl. No.: 15/685,676

(22) Filed: Aug. 24, 2017

(65) Prior Publication Data

US 2018/0063493 A1  Mar. 1, 2018

Related U.S. Application Data (60) Provisional application No. 62/380,045, filed on Aug. 26, 2016.

(51) Int. Cl.
*H04N 9/31* (2006.01)
*G03B 17/54* (2006.01)
*G06F 3/16* (2006.01)

(52) U.S. Cl.
CPC .......... *H04N 9/3147* (2013.01); *G03B 17/54* (2013.01); *G06F 3/165* (2013.01); *H04N 9/3182* (2013.01); *H04N 9/3194* (2013.01)

(58) Field of Classification Search
CPC .... H04N 9/3147; H04N 9/3182; G03B 17/54; G06F 3/165
USPC .......................................................... 353/30
See application file for complete search history.

(56) References Cited

U.S. PATENT DOCUMENTS

| 4,747,121 | A | * | 5/1988 | Nash | H04M 11/007 |
| | | | | | 379/102.03 |
| 5,025,314 | A | * | 6/1991 | Tang | G06F 3/0425 |
| | | | | | 178/18.11 |
| 2008/0298571 | A1 | * | 12/2008 | Kurtz | H04N 7/142 |
| | | | | | 379/156 |
| 2010/0188557 | A1 | * | 7/2010 | Tan | G06F 3/0425 |
| | | | | | 348/342 |

OTHER PUBLICATIONS

Cefsharp. Retrieved Jan. 12, 2016 from https://github.com/cefshart/cefsharp.

(Continued)

*Primary Examiner* — Steven Whitesell Gordon
*Assistant Examiner* — Jerry L Brooks
(74) *Attorney, Agent, or Firm* — Westman, Champlin & Koehler, P.A.; Theodore M. Magee (57) ABSTRACT A method includes using a first projector-camera system to project a first video onto a first surface and to capture a second video of the first surface while the first video is projected onto the first surface. Communication is established between the first projector-camera system and a second projector-camera system, such that the second video is transmitted to the second projector-camera system and such that video of a second surface of the second projector-camera system is received by the first projector-camera system and forms part of the first video. Light is applied to the first surface sufficient to cancel video echo between the first projector-camera system and the second projector-camera system.

12 Claims, 11 Drawing Sheets (56) References Cited

OTHER PUBLICATIONS

Izadi et al., C-Slate: A Multi-Touch and Object Recognition System for Remote Collaboration using Horizontal Surfaces, Proceedings of the Second Annual IEEE International Workshop on Horizontal Interactive Human-Computer Systems (Tabletop 2007), 8 pages.
Junuzovic et al., IllumiShare: Sharing any Surface, In Proceedings of the SIGCHI Conference on Human Factors in Computing Systems (CHI '12), ACM, New York, NY, USA, 1919-1928.
Liao et al., Robust and Accurate Visual Echo Cancellation in a Full-Duplex Projector-Camera System, IEEE Transactions on Pattern Analysis and Machine Intelligence, vol. 30, No. 10, 2006.
Sprout Developer Guide, Sprout SDK Bindings: Version 1.0.4, 2016, 195 pages.
Tang et al., VideoDraw: A Video Interface for Collaborative Drawing, In Proceedings of the SIGCHI Conference on Human Factors in Computing Systems, ACM Transactions on Information Systems, vol. 9, No. 2, 1991, pp. 170-184.
WebRTC—Architecture, Retrieved Jan. 12, 2016 from https://webrtc.org/architecture/#TOC-STUNICE.
Yarosh et al., Developing a Media Space for Remote Synchronous Parent-Child Interaction, In Proceedings of the 8th International Conference on Interaction Design and Children (IDC '09), ACM, New York, NY, USA, 97-105.
Yarosh et al., "Almost Touching": Parent-Child Remote Communication using the Sharetable System, In Proceedings of the 2013 Conference on Computer Supported Cooperative Work (CSCW '13), ACM, New York, NY, USA 181-192.

* cited by examiner

SHARING PROJECTOR-CAMERA WORKSPACES

CROSS-REFERENCE TO RELATED APPLICATION

The present application is based on and claims the benefit of U.S. provisional patent application Ser. No. 62/380,045, filed Aug. 26, 2016, the content of which is hereby incorporated by reference in its entirety.

This invention was made with government support under IIS-1526085 awarded by the National Science Foundation. The government has certain rights in the invention.

BACKGROUND

In a projector-camera system, a projector displays an image on a surface and a camera captures images of the surface. The captured image includes both the projected image and any physical objects that are on top of the surface. In some projector-camera systems, users are able to submit commands to manipulate objects displayed in the projected image and/or to add content to the image, such as text or drawing objects like paint strokes, lines, shapes, fill colors and fill patterns. In one such system, the projector displays the images on a touch sensitive pad that can receive the user inputs for manipulating objects and adding content. With each input command, the image is updated such that it appears as if the user is interacting directly with the objects in the projected image.

Some projector-camera systems include a second display and camera, which are vertically mounted. The second display provides additional screen area for interacting with the system and in some embodiments provides a touch sensitive screen to receive inputs. The second camera is capable of capturing an image of the user of the system.

SUMMARY

A method includes using a first projector-camera system to project a first video onto a first surface and to capture a second video of the first surface while the first video is projected onto the first surface. Communication is established between the first projector-camera system and a second projector-camera system, such that the second video is transmitted to the second projector-camera system and such that video of a second surface of the second projector-camera system is received by the first projector-camera system and forms part of the first video. Light is applied to the first surface sufficient to cancel video echo between the first projector-camera system and the second projector-camera system.

In a further embodiment, a system includes a projector that projects a first video onto a first surface and a camera that captures a second video of the first surface while the first video is projected onto the first surface. A network interface communicates with a second system to send the second video to the second system and to receive a third video that forms part of the first video. A light source directs light so that it is captured by the camera so as to reduce video echo between the system and the second system.

In a still further embodiment, a system includes a first device having a display and network interface and a second device having a display and a network interface. The second device establishes a communication session with a projector-camera system through the network interface and receives two video streams from the projector-camera system through the communication session. An indication that one of the two video streams is to appear on the first device is received and based on the received indication, the second device triggers at least one of the first device and the projector-camera system to establish a second communication session with each other such that one of the two video streams is received by the first device from the projector-camera system instead of being received by the second device.

DETAILED DESCRIPTION OF ILLUSTRATIVE EMBODIMENTS

There are many systems available for "sharing" a digital workspace between two computers through a network connection. When a digital workspace is shared, both computer displays show the digital workspace in real-time such that changes made within the digital workspace on one computer are conveyed to the other computer. In some systems, it is possible for users of both computers to manipulate objects in the digital workspace while it is being shared.

Attempts have been made to share the projected images of projector-camera systems such that two projector-camera systems will display the same image and users of both systems can manipulate objects shown in the image and add items to the image. Such sharing can be accomplished by sharing the image data that the systems use to generate the projected image. Input commands relative to the image data are also shared so that both parties can manipulate and add to the image data.

A more difficult problem is to share video of the surface that the image is projected on between two projector-camera systems. In such a system, the camera for one system generates a video stream showing the projected image on the surface as well as any physical objects, such as a user's hands or other objects that are placed between the camera and the surface. The other projector-camera also generates a video stream capturing the image projected on its surface and any objects between the camera and the surface. The video stream from the first projector-camera system is sent to the second projector-camera system, which projects the video stream onto the second surface. Similarly, the video stream from the second projector-camera system is projected by the first projector-camera system onto the first surface.

Figure 1:
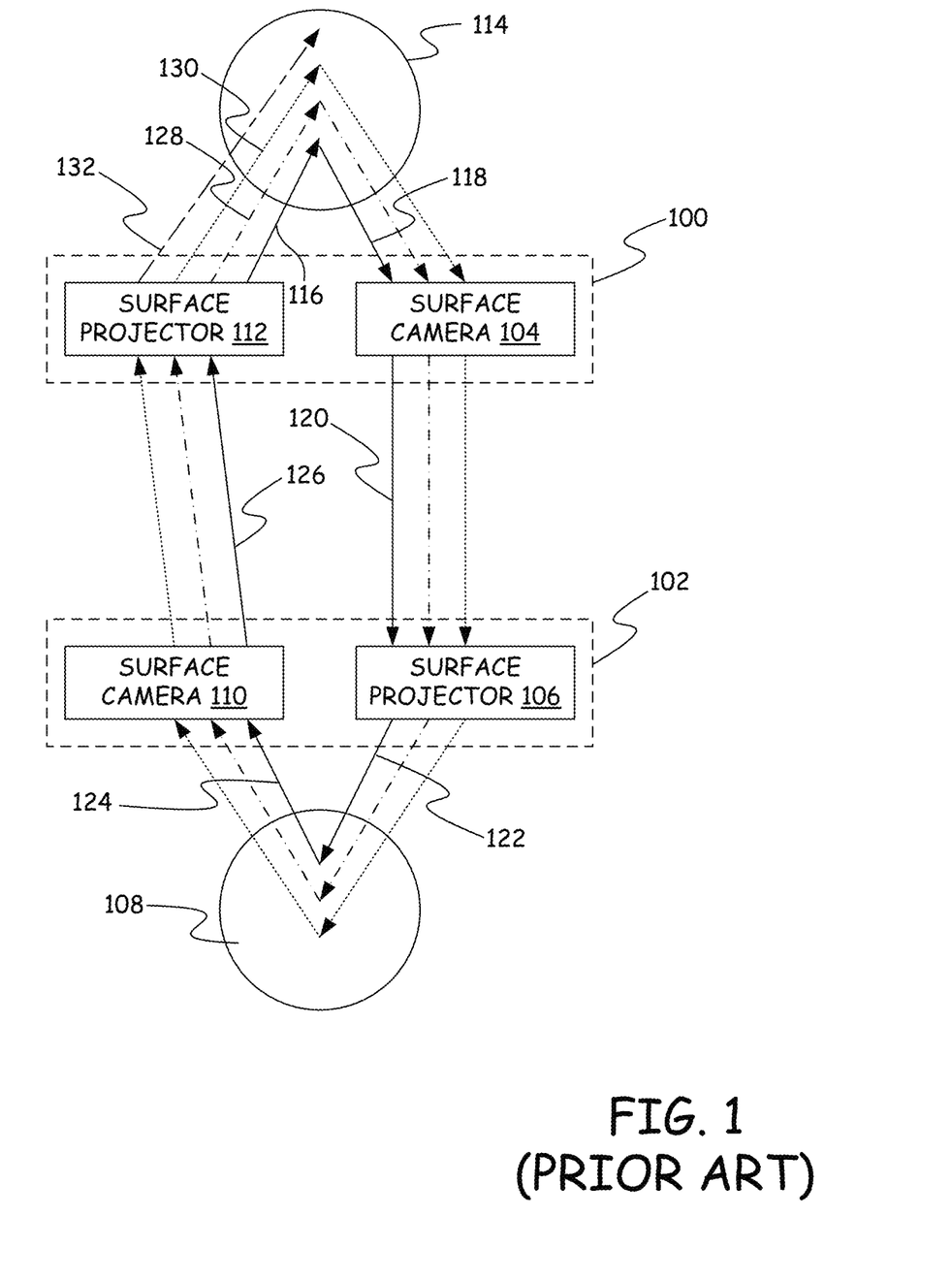
FIG. 1 is schematic diagram of two projector-camera systems showing video feedback that generates video echoes under the prior art.

FIG. 1 provides a simplified schematic diagram of such a sharing system. In FIG. 1, a first projector-camera system 100 has a first surface projector 112 and a first surface camera 104 and a second projector-camera system 102 has a second surface camera 110 and a second surface projector 106. Surface projector 112 projects images onto a first surface 114, which are captured by surface camera 104. Surface projector 106 projects images onto a second surface 108, which are captured by surface camera 110.

The sharing of video streams between surface camera 104 and surface projector 106 and between surface camera 110 and surface projector 112 produces a feedback loop. For example, when surface projector 112 projects an image 116, that image is reflected off surface 114 to become a reflected image 118 that is captured by surface camera 104. The reflected image is transmitted 120 to surface projector 106 where it is projected as projected image 122 on surface 108. The projected image reflects off surface 108 to become reflected image 124, which is captured by surface camera 110. Surface camera 110 transmits 126 the captured image to surface projector 112. Surface projector 112 then displays an echo image 128 based on the received image data 126 from surface camera 110. Surface projector 112 continues to project the original image 116 while it is also projecting echo image 128. Echo image 128 and original image 116 are then captured by surface camera 104, are routed back to surface projector 106, are displayed on surface 108, are captured by surface camera 110 and are returned again to surface projector 112, which generates a second echo 130. Initial image 116, echo image 128 and second echo image 130 then traverses the feedback loop back to surface projector 112 to produce a third echo image 132. Thus, from the initial image 116, three echo images 128, 130 and 132 have been displayed on surface 114.

Thus, a video echo is an image of a surface that completes a video feedback loop to be redisplayed on the same surface.

Figure 2:
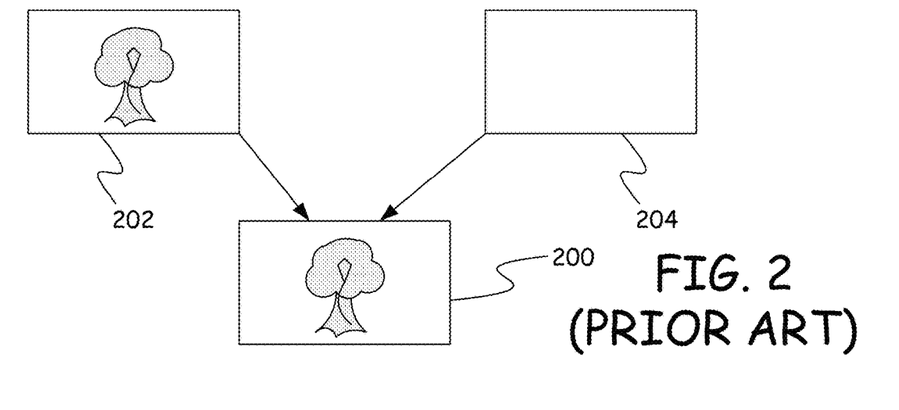
FIGS. 2-4 show the progression of a video echo in one of the two projector-camera systems of FIG. 1.
Figure 3:
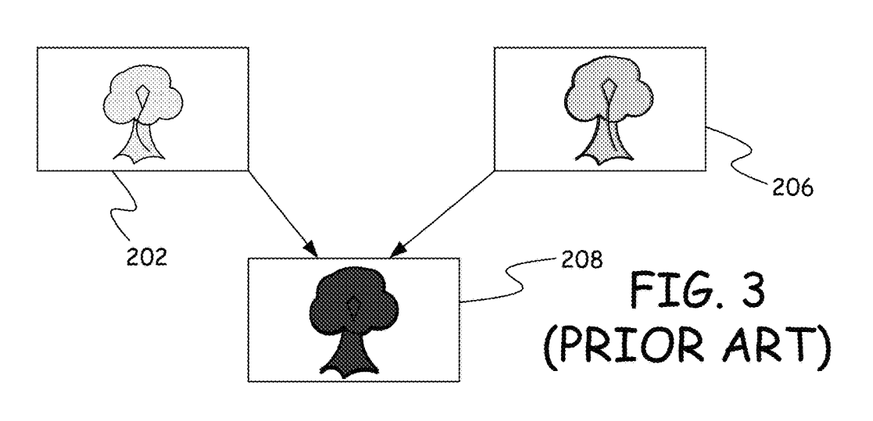
Figure 4:
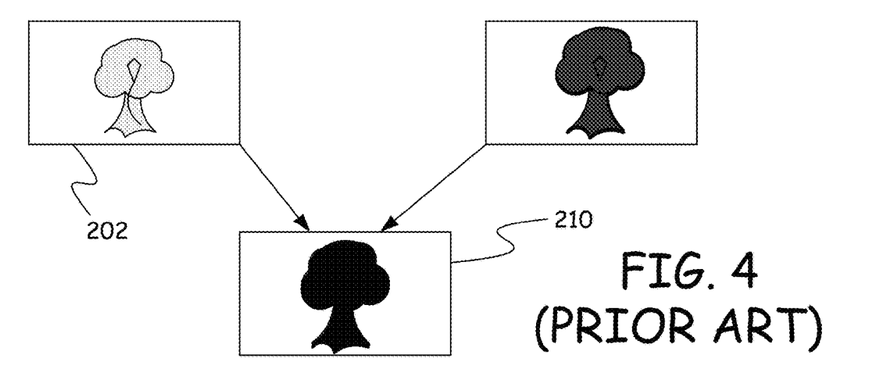

FIGS. 2-4 show the progression of the image projected by surface projector 112 due to the video echo shown in FIG. 1. In FIG. 2, projected image 200 is an initial image projected by surface projector 112. As shown in FIG. 2, projected image 200 is a composite of a digital workspace image 202 generated by a processor in projector-camera system 100 and a received video image 204 from surface camera 110. Initially, as shown in FIG. 2, there is no received image from surface camera 110 and projected image 200 only contains image data generated for the digital workspace by the processor.

In FIG. 3, the projected image 200 projected by surface projector 112 has traveled through the feedback loop shown in FIG. 1 several times. The digital workspace image 202 remains the same in FIG. 3 but the image received from surface camera 110 is a darkened version 206 formed by the overlay of multiple video echoes as received from surface camera 110. The video echoes 206 are merged with digital workspace image 202 to form the projected image 208, which is a further darkened version of digital workspace image 202. Thus, with each trip around the feedback loop, the initial projected image becomes darker and darker as more and more video echoes are overlaid on top of it. In addition, due to noise and movement of the projectors and cameras, the image will become blurry due to lateral offsets in the video echoes. Eventually, as shown in FIG. 4, the projected image 210 loses all of the details shown in the initial digital image 202 and becomes extremely dark.

The video echoes can take on different appearances as well. In particular, the video echoes can form artifacts that are not present in the initial digital image but that propagate with each successive trip through the feedback loop. Additionally, if an object is moved above one of the surfaces 108 and 114, the image of the object in its initial position will continue to be shown due to the video echo of the image. This results in a "ghosting" appearance as the object is moved.

Figure 5:
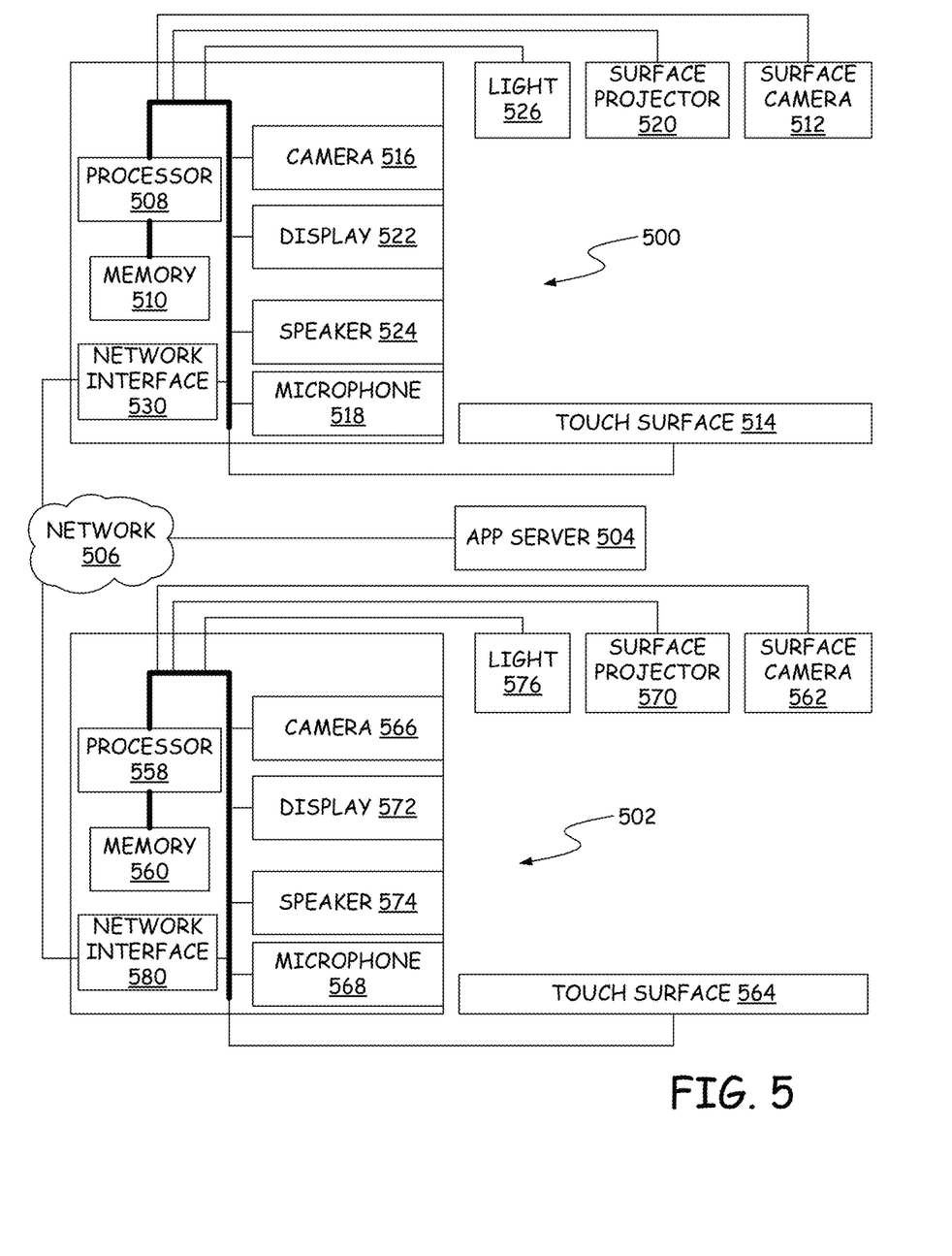
FIG. 5 displays a block diagram of a networked system of two projector-camera systems.
Figure 6:
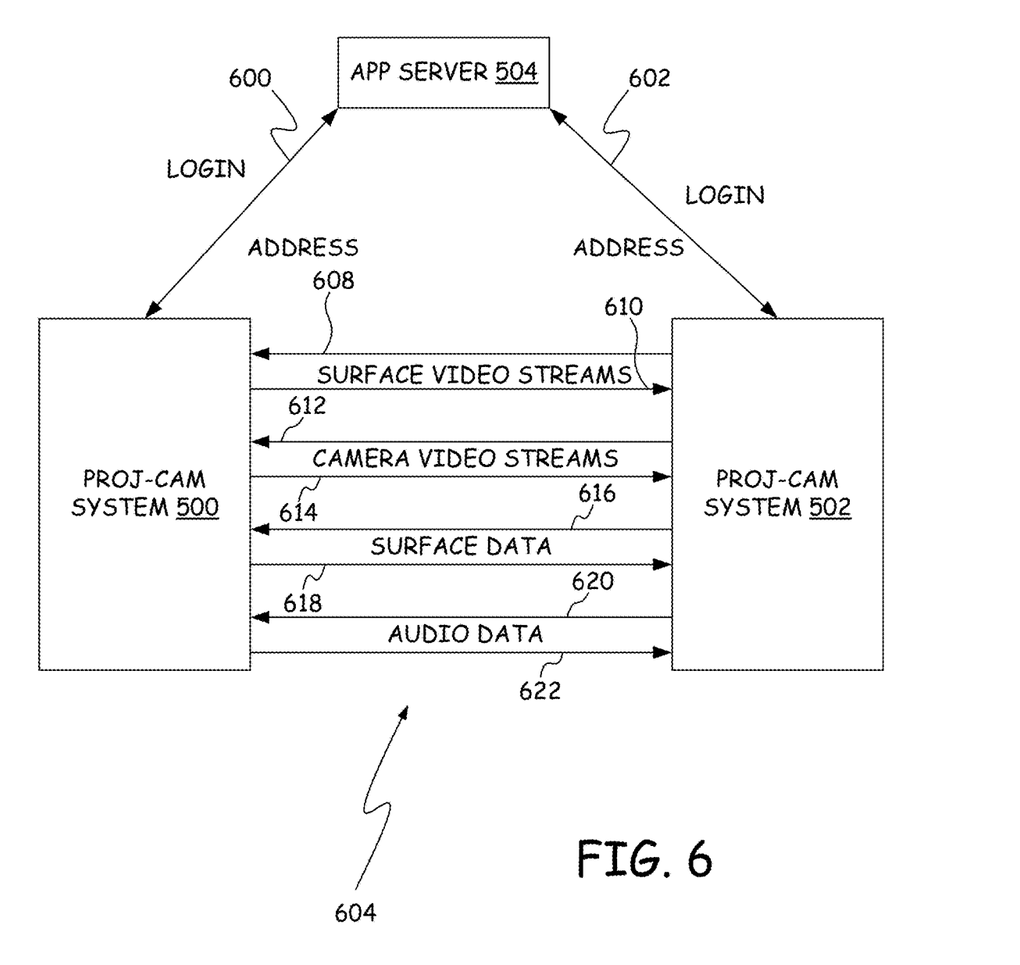
FIG. 6 provides a block diagram showing communication streams between the projector-camera systems of FIG. 5.

Many of the embodiments described below reduce or eliminate video echo when two projector-camera systems exchange video streams captured by their cameras. FIG. 5 provides a block diagram of such a system and FIG. 6 shows a more generalized block diagram showing the transmission of data between the various components of the system. In FIGS. 5 and 6, a first projector-camera system 500, a second projector-camera system 502 and an application server 504 communicate with each other over a network 506. First projector-camera system 500 includes a processor 508, which accesses a memory 510 to retrieve instructions that processor 508 executes to perform methods discussed below. Processor 508 is connected to a number of input and output devices through various interfaces (not shown). The input devices include a surface camera 512, a touch surface 514, a camera 516 and a microphone 518. Surface camera 512 captures images of touch surface 514 and camera 516 is positioned to capture images of the user of projector-camera system 500. Microphone 518 captures sound around projector-camera system 500. The output devices connected to processor 508 include surface projector 520, which projects an image onto touch surface 514, a display 522, which is typically oriented vertically, a speaker 524, which generates sound, and a light 526, which projects light onto touch surface 514 such that the light is reflected into surface camera 512. Processor 508 executes code in memory 510 that allows processor 508 to act as a controller for surface projector 520, light 526, display 522 and speaker 524.

Processor 508 generates an image of a digital workspace onto touch surface 514 using surface projector 520. By touching touch surface 514, users are able to manipulate objects shown in the projected image. In particular, the touch inputs detected by touch surface 514 are transmitted to processor 508, which interprets the touch inputs as representing certain input commands relative to one or more portions of the projected image. Based on the input received through touch surface 514, processor 508 updates the image of the workspace to reflect the inputs provided through touch surface 514.

Projector-camera system 502 is identical to projector-camera system 500 and includes processor 558, memory 560, surface camera 562, touch surface 564, camera 566, microphone 568, surface projector 570, display 572, speaker 574 and light 576, which operate in an identical manner to those same elements described for projector-camera system 500. Projector-camera systems 500 and 502 include respective network interfaces 530 and 580, which allow projector-camera systems 500 and 502 to communicate with each other and with application server 504 through network 506.

FIG. 6 shows a communication structure for projector-camera systems 500 and 502 and application server 504 in accordance with one embodiment. Under the communication structure of FIG. 6, projector-camera system 500 and projector-camera system 502 allow a user to login to application server 504 through respective communication channels 600 and 602. Communication channels 600 and 602, in one embodiment, are Representational State Transfer (REST) APIs. During login, projector-camera systems 500 and 502 provide login credentials to application server 504. When a projector-camera system logins into application server 504, application server 504 updates a list of available contacts for other projector-camera systems to indicate that the newly logged in projector-camera system is available. A user may request the address of a projector-camera system by selecting an icon in a display provided by application server 504 along communication channels 600 or 602. Using the returned address, the projector-camera system is able to establish a peer-to-peer communication session 604 with another projector-camera system. In accordance with one embodiment, peer-to-peer communication session 604 is created using webRTC through a web browser shell. Peer-to-peer communication session 604 includes a surface video stream 608 from projector-camera system 502 to projector-camera system 500 that contains video captured by surface camera 562 and a surface video stream 610 from projector-camera system 500 to projector-camera system 502 that contains video captured by surface camera 512. Peer-to-peer communication session 604 also includes a camera video stream 612 captured by camera 566 of projector-camera system 502 and provided to projector-camera system 500 and a camera video stream 614 captured by camera 516 of projector-camera system 500 and provided to projector-camera system 502. Peer-to-peer communication session 604 further includes surface data 616 and 618, which are data related to input commands provided by the user relative to the digital workspace projected on the respective surfaces. In some embodiments, surface data 616 is data received from touch surface 564 of projector-camera system 502 and surface data 618 is data received from touch surface 514 of projector-camera system 500. Using surface data 616 and 618, each projector-camera system is able to update the digital workspace based on inputs provided by the user of the other projector-camera system. Lastly, peer-to-peer communication session 604 includes audio data 620 and 622 where audio data 620 is captured by microphone 568 of projector-camera system 502 and is provided to projector-camera system 500 and audio data 622 is captured by microphone 518 of projector-camera system 500 and is provided to projector-camera system 502.

Although a peer-to-peer communication session 604 is shown in FIG. 6, other communication architectures can be used including architectures wherein projector-camera systems 500 and 502 communicate with each other through one or more servers such as media servers or any video/audio transmission-capable server system.

Figure 7:
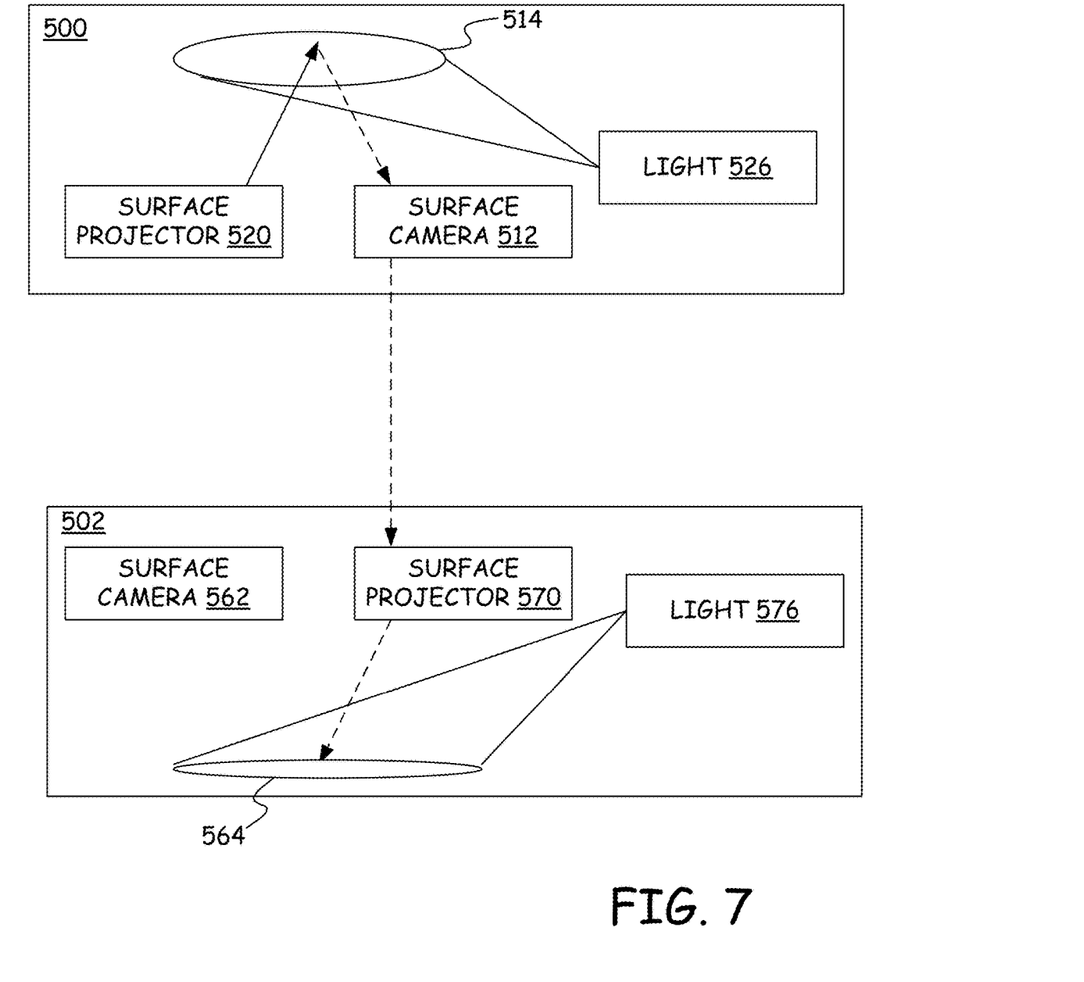
FIG. 7 provides a schematic diagram showing the reduction of visual echo in accordance with some embodiments.

In accordance with one embodiment, video echo is reduced or eliminated by counter-intuitively applying light from light sources 526 and/or 576 to the surface, as shown in FIG. 7. In particular, as shown in FIG. 7, as surface projector 520 projects an image onto touch surface 514, light 526 projects light onto touch surface 514. The light from light source 526 is reflected off surface 514 and into surface camera 512 along with a portion of the image projected by surface projector 520. This additional light reduces the darkness of dark portions of the image projected by surface projector 520 thereby reducing the contrast in the version of the projected image captured by surface camera 512. The captured image from surface camera 512 is communicated to surface projector 570, which then projects it onto touch surface 564. In some embodiments, light 526 is sufficient on its own to remove the video echo. In other embodiments, light 576 of projector-camera system 502 projects light onto touch surface 564 to further mute the video echo, such that touch surface camera 562 does not capture an image of the video echo. As a result, touch surface camera 562 does not convey the video echo back to surface projector 520.

In the various embodiments, the video echo may be completely removed, also referred to as canceling the video echo, or may be substantially reduced or suppressed such that the video echo is not as noticeable in the projected workspaces.

In accordance with some embodiments, lights 526 and 576 are visible lights. In other embodiment, lights 526 and 576 are infrared lights that cannot be seen by the user but that can be detected by the cameras.

Figure 8:
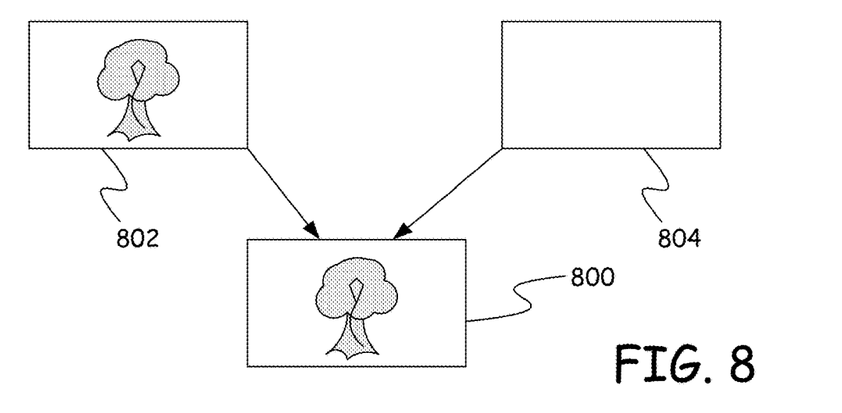
FIGS. 8-10 show the reduction of video echo in accordance with some embodiments.
Figure 9:
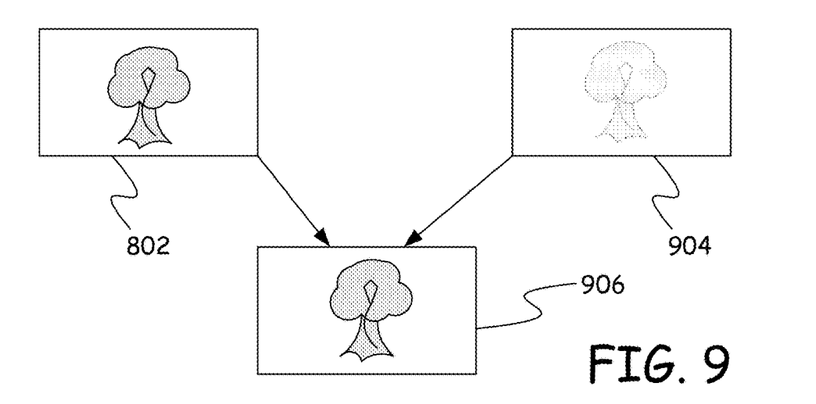
Figure 10:
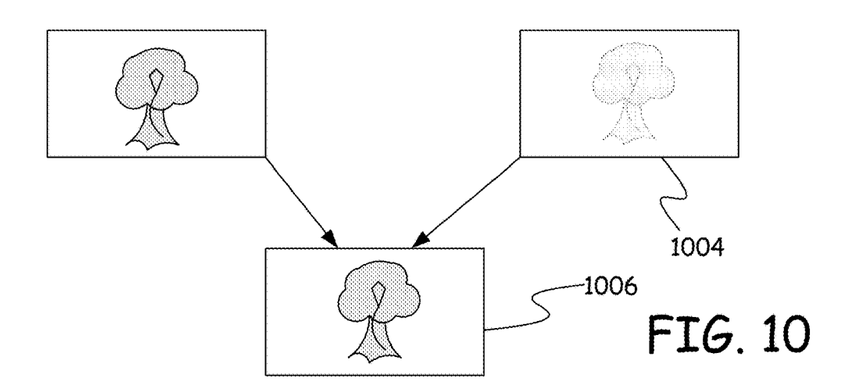

FIGS. 8-10 provide a sequence of images as projected by surface projector 570 showing the video echo cancellation. In FIG. 8, the projected image 800 is shown to be the combination of a digital workspace image 802 and a surface video stream 804 from surface camera 512. When digital workspace image 802 is initially shown by surface projector 520 and surface projector 570, surface camera 512 has yet to capture an image of the workspace and as a result, surface video stream 804 does not contain an image of the digital workspace and projected image 800 just contains digital workspace image 802 as generated by processor 558.

In FIG. 9, surface camera 512 provides an image 904 of the digital workspace projected by surface projector 520. As shown in FIG. 9, image 904 has low contrast due to the addition of light from light source 526. As a result, when image 904 is added to digital workspace image 802, the resulting projected image 906 is not substantially different from digital workspace image 802. In fact, image 904 has so little contrast that the contribution of image 904 to projected image 906 is not detected by surface camera 572 and as a result, the video echo is cancelled. This can be seen in FIG. 10, which shows an image 1004 from the surface video provided by surface camera 512 at a later time than is shown in FIG. 9. As shown in FIG. 10, the contrast of image 1004 is substantially the same as the contrast of image 904. This occurs because the video feedback loop has been broken and the video echoes are not building on each other. As a result, projected image 1006 is the same as projected image 906 and the video echo is substantially not present in the system.

In accordance with one embodiment, processors 508 and 558 of projector-camera systems 500 and 502 control light sources 526 and 576 to reduce or eliminate video echo. In particular, processor 508 analyzes the image captured by surface camera 512 to determine the extent to which the captured image contains portions of the workspace image generated by processor 508. Processor 508 then increases the intensity produced by light 526 to reduce the amount of the workspace image that is captured by surface camera 512. Light 526 can be increased several times until the desired amount of video echo suppression is achieved.

In an alternative embodiment, processors 508 and 558 operate in a cooperative manner to alternatingly increase the intensity of lights 526 and 576 until the visual echo is sufficiently suppressed or eliminated. In such embodiments, processor 508 first increases the intensity of light 526 then communicates this increase to processor 558. Processor 558 then evaluates whether the workspace image is still present in the image captured by surface camera 562. If so, processor 558 increases the intensity of light 576 and sends a message to processor 508 indicating the increase in the light intensity. Processor 508 then determines if a further increase in the intensity of light 526 is needed. This process is then repeated until the video echo from both projector-camera systems is adequately suppressed.

In embodiments in which light 526 and light 576 are respectively controlled by processors 508 and 558, the intensities of lights 526 and 576 begin at pre-communication levels that can be set by the respective users. When the communication session ends, the intensities of lights 526 and 576 are automatically returned to the pre-communication levels by processors 508 and 558. For example, if lights 526 or 576 were not on when the communication session started, processor 508 and 558 will turn off the lights completely when the communication session ends.

In other embodiments, the video echo is reduced or eliminated by adjusting the white balance of one or both of surface cameras 512 and 562. In accordance with some of these embodiments, processors 508 and 558 of projector-camera systems 500 and 502 control the whie balances of surface cameras 512 and 562 to reduce or eliminate video echo. In particular, processor 508 analyzes the image captured by surface camera 512 to determine the extent to which the captured image contains portions of the workspace image generated by processor 508. Processor 508 then adjusts the white balance of camera 512 to reduce the amount of the workspace image that is captured by surface camera 512. The white balance of surface camera 512 can be adjusted several times until the desired amount of video echo suppression is achieved.

In an alternative embodiment, processors 508 and 558 operate in a cooperative manner to alternatingly adjust the white balances of surface cameras 512 and 562 until the visual echo is sufficiently suppressed or eliminated. In such embodiments, processor 508 adjusts the white balance of surface camera 512 then communicates this adjustment to processor 558. Processor 558 then evaluates whether the workspace image is still present in the image captured by surface camera 562. If so, processor 558 adjust the white balance of surface camera 562 and sends a message to processor 508 indicating the adjustment in white balance. Processor 508 then determines if a further adjustment in the white balance of surface camera 512 is needed. This process is then repeated until the video echo from both projector-camera systems is adequately suppressed.

Figure 11:
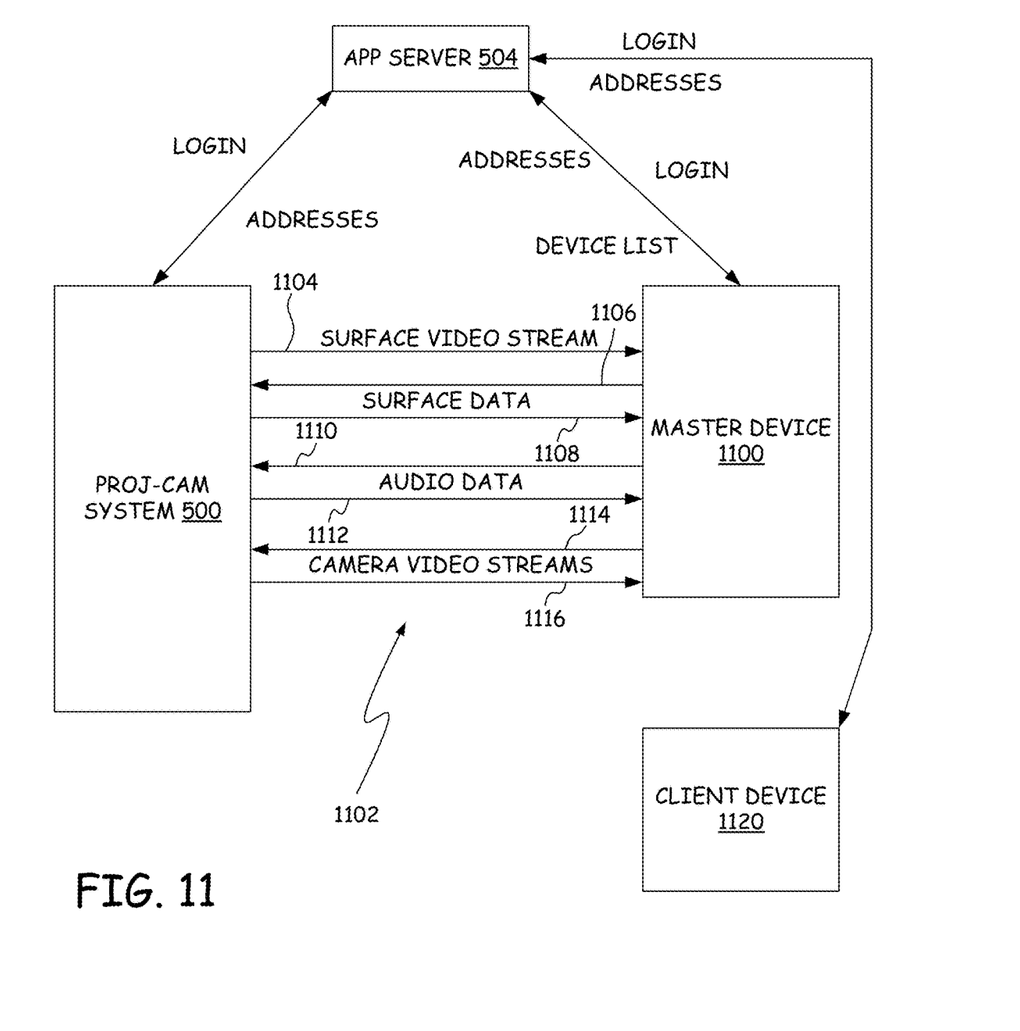
FIG. 11 shows a block diagram for communication with a projector-camera system in accordance with a second embodiment.

FIG. 11 provides a block diagram of a second embodiment in which projector-camera system 500 communicates with a master device 1100, which is not a projector-camera system. Instead, master device 1100 is a typical mobile device such as a tablet device or Smartphone that includes a processor and a touch sensitive display. Master device 1100 does not have a projector and does not capture an image of a projected digital workspace. Master device 1100 does have a camera that captures an image of the user.

As shown in FIG. 11, both projector-camera system 500 and master device 1100 communicate with application server 504 to allow the user to login to application server 504. Through application server 504, projector-camera system 500 or master device 1100 are able to request the establishment of a communication session between the two devices. For example, application server 504 can show when a device has logged into application server 504 and provide icons that allow a user to select the device for the communication session. After a device has been selected for a communication session and after the user of the device accepts the communication session, a peer-to-peer communication session 1102 is established between master device 1100 and projector-camera system 500.

Communication session 1102 includes a one-way surface video stream 1104 that contains the video of touch surface 514 captured by surface camera 512. Master device 1100 does not capture an image of a projected digital workspace and as such does not provide a surface video stream.

Master device 1100 does provide surface data 1106, which includes input commands from the user that indicate interactions between the user and the digital workspace. In accordance with one embodiment, the digital workspace is shown in a window on a touch-sensitive display of master device 1100 and the inputs are received as touch inputs on the touch-sensitive display. Projector-camera system 500 provides surface data 1108, which indicates how the user of projector-camera system 500 is interacting with the digital workspace through inputs received from touch surface 514, for example.

Master device 1100 also includes a microphone, which generates audio data 1110 that is transmitted to projector-camera system 500 and master device 1100 includes a speaker that is capable of generating audio from audio data 1112 provided by projector-camera system 500 based on data received by microphone 518.

Communication session 1102 also includes two camera video streams 1114 and 1116. Camera video stream 1114 contains video captured by a camera in master device 1100 that is typically pointed toward the user of the device and thus captures images of the user. Similarly, camera video stream 1116 contains video captured by camera 516, which is directed at the user of projector-camera system 500.

Figure 12:
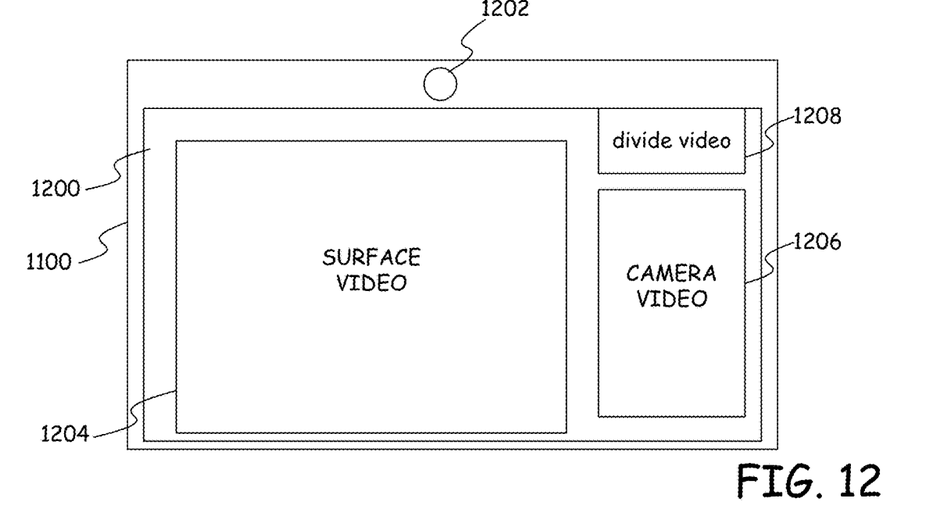
FIG. 12 shows a user interface with two video streams shown on a mobile device for the embodiment of FIG. 11.

FIG. 12 provides a front view of an embodiment of master device 1100, which in FIG. 12 takes the form of a tablet device. The tablet device includes a display 1200 and a camera 1202. Within display 1200, a window 1204 contains a combination of surface video captured by surface camera 512 and the shared digital workspace generated by a processor in master device 1100. A window 1206 includes video captured by camera 516 of projector-camera system 500. Typically, the video in window 1206 will contain an image of the user of projector-camera system 500.

Display 1200 is a touch sensitive display, such that when the user touches the portion of the display corresponding to window 1204, the user is able to manipulate objects in the shared digital workspace and to add content to the shared digital workspace such as drawing objects like paintbrush strokes, pencil strokes, line segments, shapes, fills and erasures, for example. The user of master device 1100 may also manipulate objects to move the digital objects to different places within the shared digital workspace and to remove objects from the shared digital workspace.

Display 1200 also includes a "DIVIDE VIDEO" video button 1208. When divide video button 1208 is selected, a request is sent from master device 1100 to application server 504 for a list of all devices that are currently logged into application server 504 and that are associated with a common user of master device 1100 and the other devices. In response, application server 504 searches for other devices that are logged into application server 504 and that are associated with the same user and returns the list of devices to master device 1100. For example, in FIG. 11, a client device 1120 associated with the user of master device 1100 has logged into application server 504.

Figure 13:
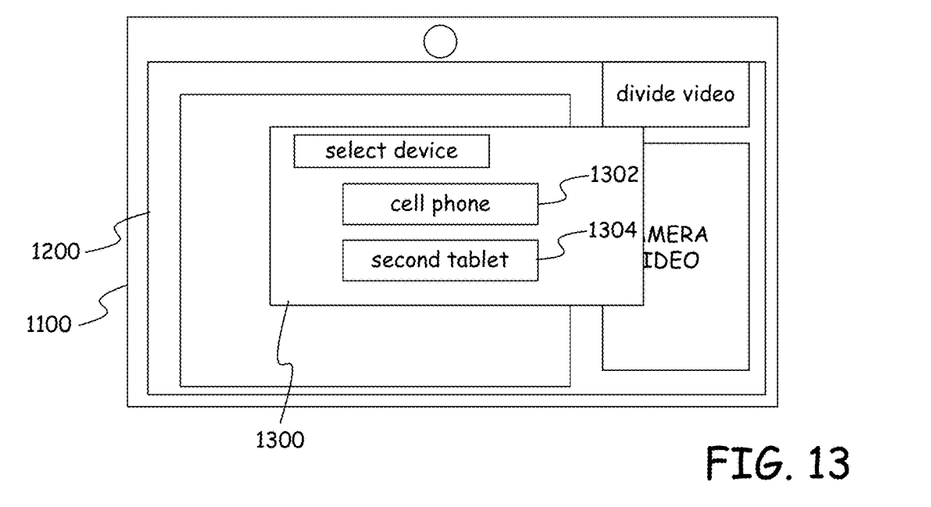
FIG. 13 shows a user interface for dividing the two video streams of FIG. 11.

FIG. 13 provides a front view of master device 1100 showing a dialogue box 1300 that has been added to display 1200 to allow the user to select which device should be used for dividing the video. In dialogue box 1300, a "CELL-PHONE" button 1302 and a "SECOND TABLET" button 1304 are provided with each button corresponding to a separate device that is currently logged into application server 504. When the user selects one of the client devices, the selection triggers the selected client device and/or projector-camera system to establish a new communication session between the client device and the projector-camera system and triggers the modification of the existing communication session between the master device and the projector-camera system.

Figure 14:
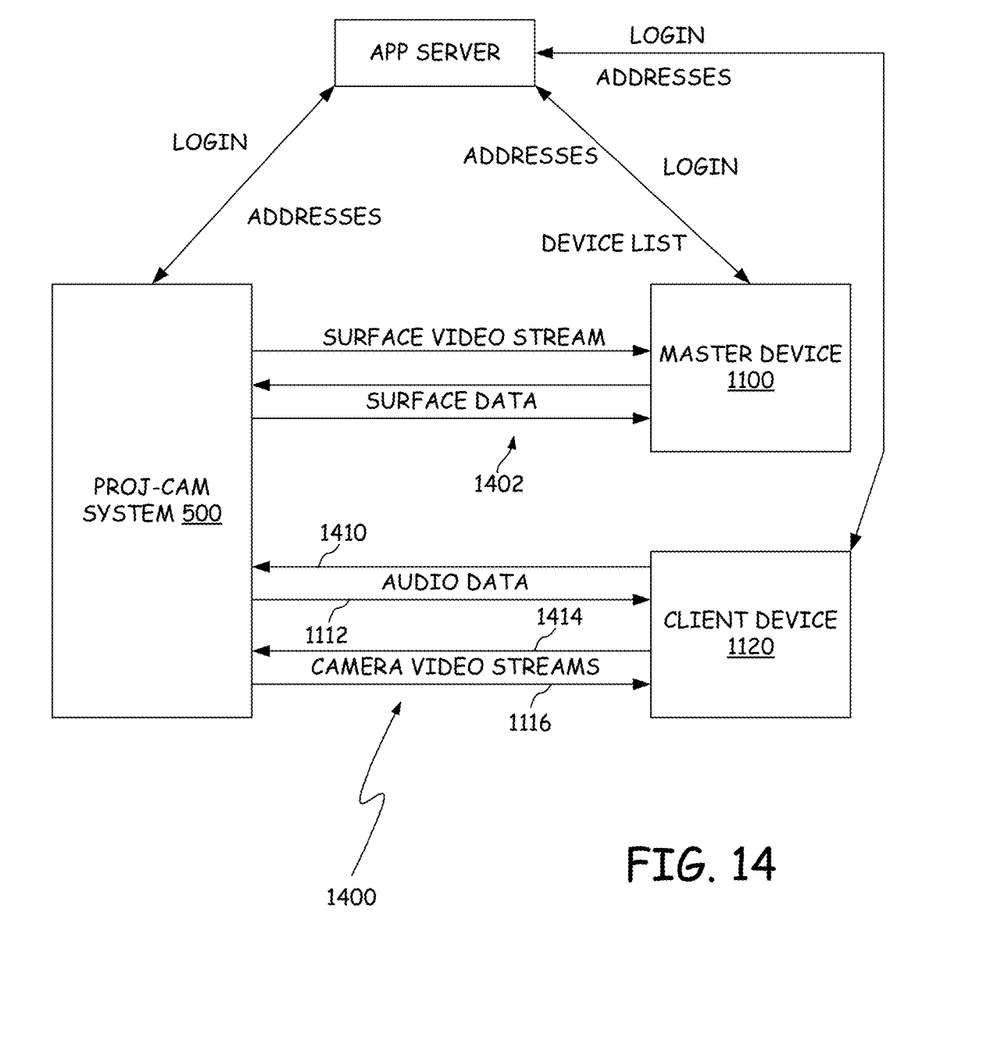
FIG. 14 shows a block diagram for communication with the projector-camera system of FIG. 11 after video has been divided in accordance with the second embodiment.

FIG. 14 provides an example of the creation of a new communication session 1400 between client device 1120 and projector-camera system 500 and a modified communication session 1402 between master device 1100 and projector-camera system 500. As shown in FIG. 14, audio data stream 1112 from projector-camera system 500 has been removed from communication session 1102 and has been inserted into communication session 1400. In addition, audio data stream 1110 has ended and a new audio stream 1410 generated by client device 1120 has been created in communication session 1400. Thus, the audio will now be collected by a microphone in client device 1120 and will be sent to projector-camera system 500 while a speaker in client device 1120 will produce sounds based on the audio in audio data stream 1112. Similarly, camera video stream 1116 from projector-camera system 500 has been removed from communication session 1102 with master device 1100 and has been placed in communication session 1400 with client device 1120. Camera video stream 1114 from master device 1100 has been ended and a new camera video stream 1414 from client device 1120 has been started in communication session 1400. Camera video stream 1414 contains video collected by a camera in client device 1120 and will typically contain images of the user of client device 1120 and master device 1100. Camera video stream 1116 will now be displayed in a window on client device 1120 instead of being displayed in camera video window 1206 as shown in FIG. 12.

Figure 15:
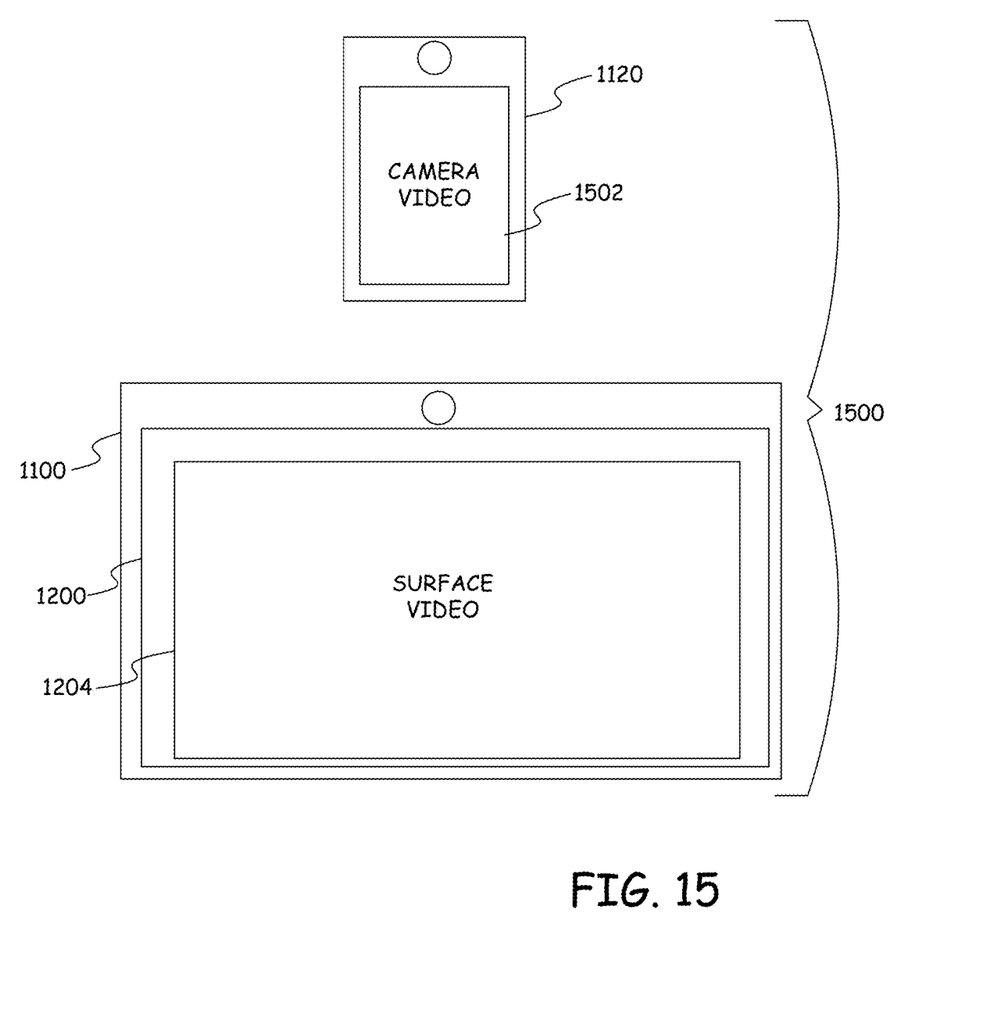
FIG. 15 shows two devices across which the video streams of FIG. 14 have been divided.

FIG. 15 shows a combined system 1500 of client device 1120 and master device 1100 after the video has been divided between client device 1120 and master device 1100. In particular, camera video from camera 516 of projector-camera system 500 appears in window 1502 of client device 1120 and surface video from surface camera 512 of projector-camera system 500 appears in window 1204, which has been expanded on display 1200 of master device 1100.

Thus, in accordance with this embodiment, a user can interact with a projector-camera system using a single mobile device or may divide the video and camera capture functions across multiple devices which both interact in a peer-to-peer manner with the projector-camera system.

In further embodiments, a peer-to-peer communication session is established between master device 1100 and client device 1120 to allow for direct communication between these two devices.

The user can return to using only master device 1100 by ending the communication session between client device 1120 and projector-camera system 500. When this occurs, communication session 1102 of FIG. 11 is reestablished and the display of master device 1100 is returned to the appearance shown in FIG. 12.

Figure 16:
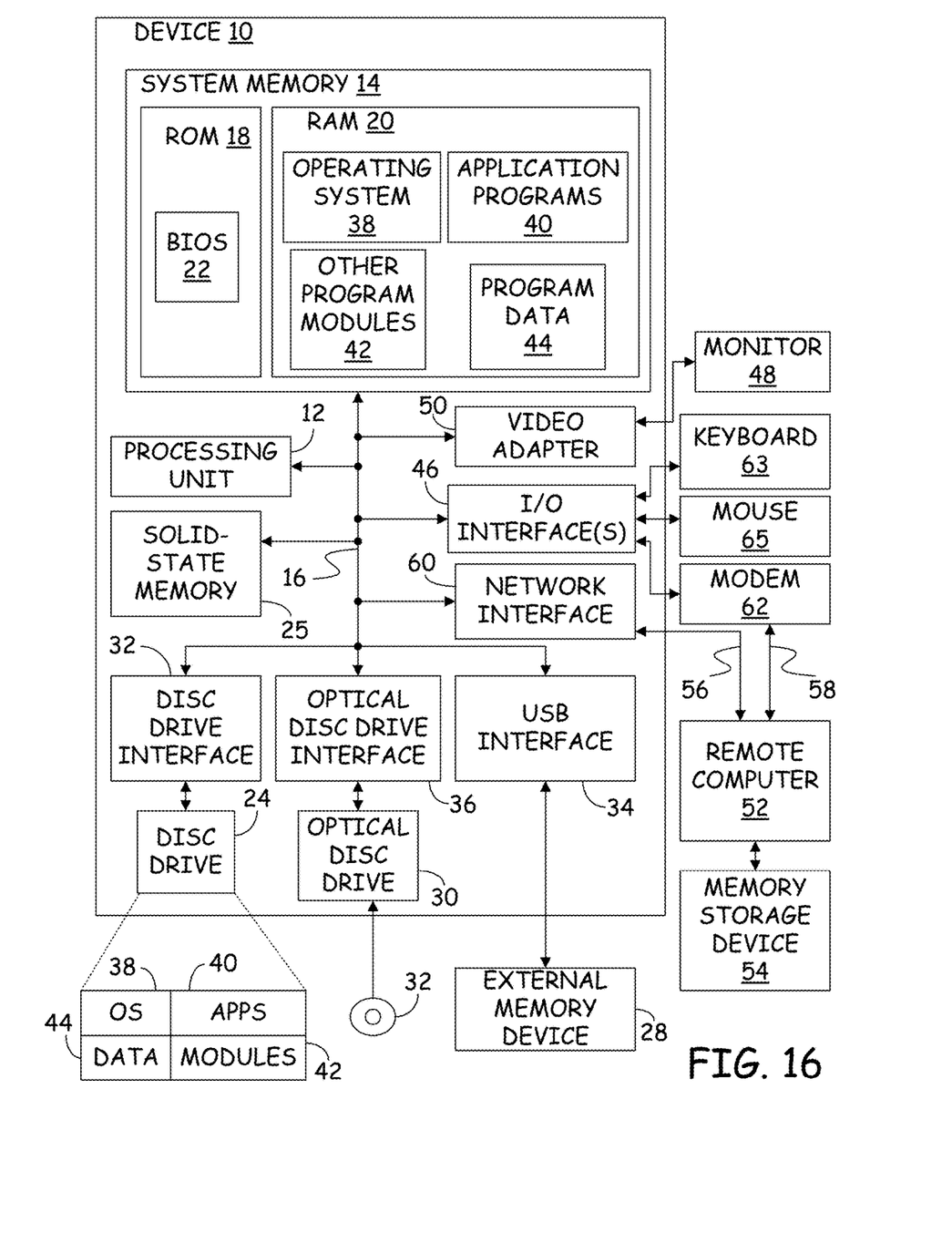
FIG. 16 provides a block diagram of a computing device.

FIG. 16 provides an example of a computing device 10 that can be used as a server in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing the server functions described above. Program data 44 may include data used in the server functions described above.

Processing unit 12, also referred to as a processor, executes programs in system memory 14 and solid state memory 25 to perform the server methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 16. The network connections depicted in FIG. 16 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46. Order 206 is received through either network interface 60 or modem 62.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 16 are exemplary and other means for establishing a communications link between the computers, such as a wireless interface communications link, may be used.

Although the present invention has been described with reference to preferred embodiments, workers skilled in the art will recognize that changes may be made in form and detail without departing from the spirit and scope of the invention.

What is claimed is:

1. A method comprising:
   using a first projector-camera system to project a first video onto a first surface and to capture a second video of the first surface while the first video is projected onto the first surface;
   establishing communication between the first projector-camera system and a second projector-camera system, such that the second video is transmitted to the second projector-camera system and such that video of a second surface of the second projector-camera system is received by the first projector-camera system and forms part of the first video; and
   reducing video echo between the first projector-camera system and the second projector-camera system through at least one of:
      adjusting a white balance of a camera in the first projector-camera system to reduce the video echo; and
      increasing an intensity of light to the first surface to reduce the video echo.

2. The method of claim 1 wherein applying light comprises applying light such that the first video is still visible on the first surface.

3. The method of claim 1 wherein applying light comprises applying infrared light.

4. The method of claim 1 further comprising increasing the intensity of the light until video echo is canceled.

5. The method of claim 1 wherein increasing an intensity of light comprises applying light to the first surface and sending a signal to the second projector-camera system indicating that light has been applied to the first surface.

6. The method of claim 5 wherein increasing an intensity of light further comprises receiving a signal from the second projector-camera system indicating that light has been applied to the second surface, determining that video echo has not been canceled and increasing the intensity of light applied to the first surface.

7. The method of claim 1 further comprising automatically removing the light when communication between the first projector-camera system and second projector-camera system ends.

8. A system comprising: a projector that projects a first video onto a first surface; a camera that captures a second video of the first surface while the first video is projected onto the first surface; a network interface that communicates with a second system to send the second video to the second system and to receive a third video that forms part of the first video; a light source separate from the projector that directs light so that it is captured by the camera so as to reduce video echo between the system and the second system; and a light controller that controls the intensity of light from the light source to achieve the reduction in the video echo wherein the light source controller automatically reduces the intensity of the light source when the network interface stops sending the second video to the second system.

9. The system of claim 8 wherein the light source is an infrared light source.

10. The system of claim 8 further comprising the network interface sending a value to the second system to indicate that the light source is on.

11. The system of claim 10 wherein the network interface receives a value indicating a second light source of the second system was turned on and in response to the received value, the light source controller determines whether the intensity of the light is to be increased.

12. The system of claim 8 further comprising an input device wherein the first video further comprises image data generated by a processor based on values from the input device.

* * * * *